United States Patent
Kristensen et al.

(10) Patent No.: US 7,574,229 B2
(45) Date of Patent: Aug. 11, 2009

(54) OUTPUT POWER CONTROL IN MULTISLOT UPLINKS

(75) Inventors: Tommy Bysted Kristensen, Smoerum (DK); Harri Jokinen, Hiisi (FI)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 10/543,723

(22) PCT Filed: Jan. 31, 2003

(86) PCT No.: PCT/EP03/00992

§ 371 (c)(1), (2), (4) Date: Dec. 15, 2005

(87) PCT Pub. No.: WO2004/068738

PCT Pub. Date: Aug. 12, 2004

(65) Prior Publication Data

US 2006/0182021 A1    Aug. 17, 2006

(51) Int. Cl.
*H04B 7/00* (2006.01)
*H04B 7/212* (2006.01)
*H04B 1/38* (2006.01)
*H04J 3/00* (2006.01)
*H04J 3/14* (2006.01)
*H04J 3/16* (2006.01)
*H04J 3/22* (2006.01)

(52) U.S. Cl. .............. 455/522; 455/69; 455/450; 370/229; 370/347; 370/465

(58) Field of Classification Search ............... 455/522, 455/436, 69; 370/337, 347, 321, 318, 229
See application file for complete search history.

(56) References Cited

U.S. PATENT DOCUMENTS

| 4,777,653 | A | * | 10/1988 | Bonnerot et al. | 455/69 |
| 4,811,421 | A | * | 3/1989 | Havel et al. | 455/69 |
| 5,086,508 | A | * | 2/1992 | Furuno | 455/69 |
| 5,333,175 | A | * | 7/1994 | Ariyavisitakul et al. | 455/423 |
| 5,491,837 | A | * | 2/1996 | Haartsen | 455/62 |
| 5,519,886 | A | * | 5/1996 | Gilbert et al. | 455/115.1 |
| 5,806,003 | A | * | 9/1998 | Jolma et al. | 455/522 |

(Continued)

FOREIGN PATENT DOCUMENTS

EP    1 056 218 A    11/2000

(Continued)

OTHER PUBLICATIONS

PCT International Search Report (as published), International Application No. PCT/EP2003/000992, Date of Completion of Search—Oct. 2, 2003.

*Primary Examiner*—Nick Corsaro
*Assistant Examiner*—Tangela T. Chambers
(74) *Attorney, Agent, or Firm*—Locke Lord Bissell & Liddell LLP

(57) ABSTRACT

In a time division multiple access (TDMA) communication system, mobile stations are given slot allocations and output power levels by base stations. This can lead to situations where the combination of slot allocation size and output power level demanded exceeds the capability of the mobile station. To solve this problem, mobile stations are given the ability to unilaterally reduce their average output powers by reducing their peak output powers or reducing their take up of allocated slots.

11 Claims, 12 Drawing Sheets

U.S. PATENT DOCUMENTS

| | | | |
|---|---|---|---|
| 5,848,062 A * | 12/1998 | Ohno | 370/311 |
| 6,226,526 B1 * | 5/2001 | Sakoda et al. | 455/522 |
| 6,519,449 B1 * | 2/2003 | Zhang et al. | 455/69 |
| 6,667,965 B1 * | 12/2003 | Yamaura et al. | 370/347 |
| 6,747,960 B2 * | 6/2004 | Tillotson | 370/318 |
| 6,760,311 B1 * | 7/2004 | Raith | 370/252 |
| 6,934,556 B2 * | 8/2005 | Takano | 455/522 |

FOREIGN PATENT DOCUMENTS

| | | |
|---|---|---|
| WO | WO 01/28105 A | 4/2001 |
| WO | WO 01/28105 A1 * | 4/2001 |

* cited by examiner

1 = Mobile Phone Network
2a = First Switching Center
2b = Second Switching Center
3a = First Base Station Center
3b = Second Base Station Center
4 = Base Transceiver Station 5 = Cell
(6a, 6b) = Mobile Stations
8 = Gateway Switching Center
9 = Packet Service Support Node
10 = Packet Service Support Gateway Node

OUTPUT POWER CONTROL IN MULTISLOT UPLINKS

FIELD OF THE INVENTION

The present invention relates to a method of operating a mobile station in a TDMA network.

BACKGROUND TO THE INVENTION

The provision of high-speed data services to mobile stations such as mobile telephones and communicators in TDMA networks has resulted in the need for mobile stations to transmit in more than one slot in each TDMA frame. A difficulty with this is that the base station needs to know the maximum power capability of the mobile station.

It has been proposed to allow a mobile station to change its power class through a is classmark change procedure or a routing area update but these procedures are found to be too slow and also not properly supported by several network implementations.

SUMMARY OF THE INVENTION

According to the present invention, there is provided a method of operating a mobile station in a TDMA network, the method comprising receiving a peak output power setting command from a base station and receiving a transmit slot allocation from the base station, characterised by:
  detecting, at the mobile station, a parameter of the rf system of the mobile station meeting a predetermined criterion;
  responding to said detection by modifying the average rf output power of the mobile station over a plurality of slots such that it falls below what would have been the average output power level had the peak output power setting command been complied with in all of the allocated slots.

The criterion may comprise an increase in slot allocation. A increase in slot allocation occurs when additional bandwidth is required. Another usable criterion is the temperature of the rf output power amplifier. The plurality of slots may or may not be consecutive.

The response may comprise reducing the average rf output power by reducing the instantaneous rf output power during each transmit slot and/or reducing the average rf output power by reducing the take up of the allocated slots. In the case of slot allocation changes, it is preferable that there is a predetermined time delay between said detection and said response.

According to the present invention, there is also provided a mobile station for a TDMA network, the mobile station comprising a controller and an rf output power amplifier, characterised in that the controller is configured to control the operation of the mobile station so as to perform a method according to the present invention.

DETAILED DESCRIPTION OF THE PREFERRED EMBODIMENTS

Preferred embodiments of the present invention will now be described, by way of example, with reference to the accompanying drawings.

Figure 1:
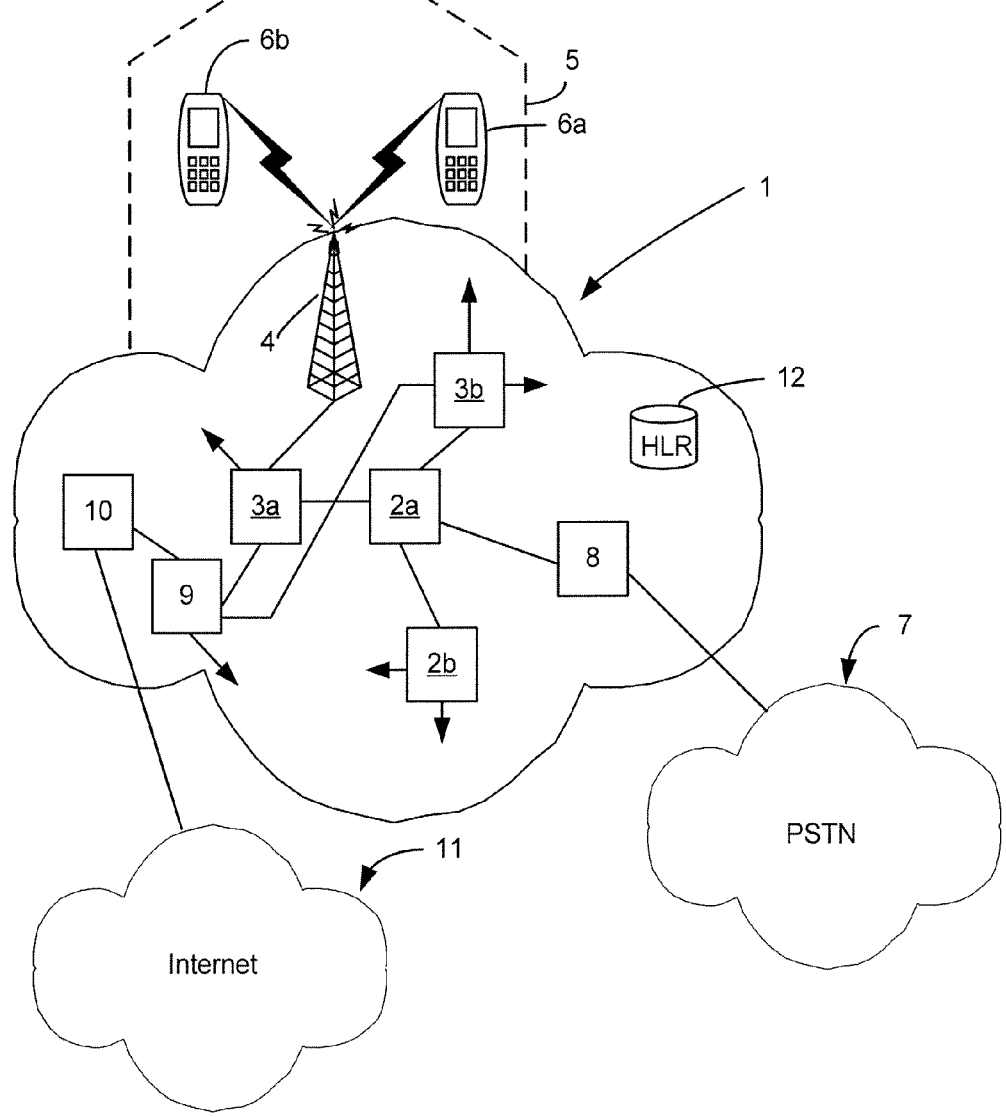
FIG. 1 shows a mobile communication system according to the present invention.

Referring to FIG. 1, a mobile phone network 1 comprises a plurality of switching centres including first and second switching centres 2a, 2b. The first switching centre 2a is connected to a plurality of base station controllers including first and second base station controllers 3a, 3b. The second switching centre 2b is similarly connected to a plurality of base station controllers (not shown).

The first base station controller 3a is connected to and controls a base transceiver station 4 and a plurality of other base transceiver stations. The second base station controller 3b is similarly connected to and controls a plurality of base transceiver stations (not shown).

In the present example, each base transceiver station services a respective cell. Thus, the base transceiver station 4 services a cell 5. However, a plurality of cells may be serviced by one base transceiver station by means of directional antennas. A plurality of mobile stations 6a, 6b are located in the cell 5. It will be appreciated that the number and identities of mobile stations in any given cell will vary with time.

The mobile phone network 1 is connected to a public switched telephone network 7 by a gateway switching centre 8.

A packet service aspect of the network includes a plurality of packet service support nodes (one shown) 9 which are connected to respective pluralities of base station controllers 3a, 3b. At least one packet service support gateway node 10 connects the or each packet service support node 9 to the Internet 11.

The switching centres 3a, 3b and the packet service support nodes 9 have access to a home location register 12.

Communication between the mobile stations 6a, 6b and the base transceiver station 4 employs a time-division multiple access (TDMA) scheme.

Figure 2:
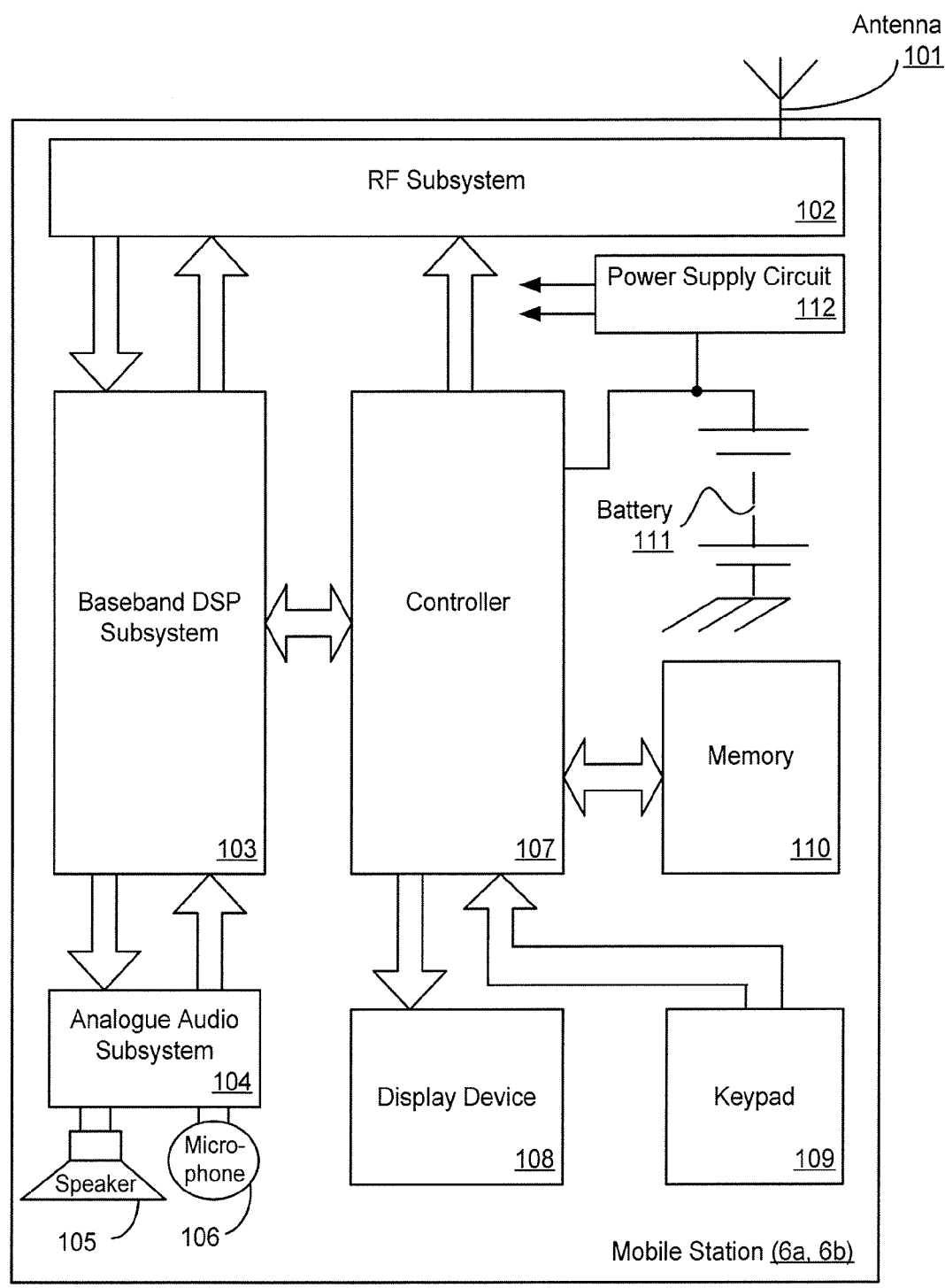
FIG. 2 is a block diagram of a mobile station.

Referring to FIG. 2, the first mobile station 6a comprises an antenna 101, an rf subsystem 102, a baseband DSP (digital signal processing) subsystem 103, an analogue audio subsystem 104, a loudspeaker 105, a microphone 106, a controller 107, a liquid crystal display 108, a keypad 109, memory 110, a battery 111 and a power supply circuit 112.

The rf subsystem 102 contains if and rf circuits of the mobile telephone's transmitter and receiver and a frequency synthesizer for tuning the mobile station's transmitter and receiver. The antenna 101 is coupled to the rf subsystem 102 for the reception and transmission of radio waves.

The baseband DSP subsystem 103 is coupled to the rf subsystem 102 to receive baseband signals therefrom and for sending baseband modulation signals thereto. The baseband DSP subsystems 103 includes codec functions which are well-known in the art.

The analogue audio subsystem 104 is coupled to the baseband DSP subsystem 103 and receives demodulated audio therefrom. The analogue audio subsystem 104 amplifies the demodulated audio and applies it to the loudspeaker 105. Acoustic signals, detected by the microphone 106, are pre-amplified by the analogue audio subsystem 104 and sent to the baseband DSP subsystem 103 for coding.

The controller 107 controls the operation of the mobile telephone. It is coupled to the rf subsystem 102 for supplying tuning instructions to the frequency synthesizer and to the baseband DSP subsystem 103 for supplying control data and management data for transmission. The controller 107 operates according to a program stored in the memory 110. The memory 110 is shown separately from the controller 107. However, it may be integrated with the controller 107.

The display device 108 is connected to the controller 107 for receiving control data and the keypad 109 is connected to the controller 107 for supplying user input data signals thereto.

The battery 111 is connected to the power supply circuit 112 which provides regulated power at the various voltages used by the components of the mobile telephone.

The controller 107 is programmed to control the mobile station for speech and data communication and with application programs, e.g. a WAP browser, which make use of the mobile station's data communication capabilities.

The second mobile station 6b is similarly configured.

Figure 3:
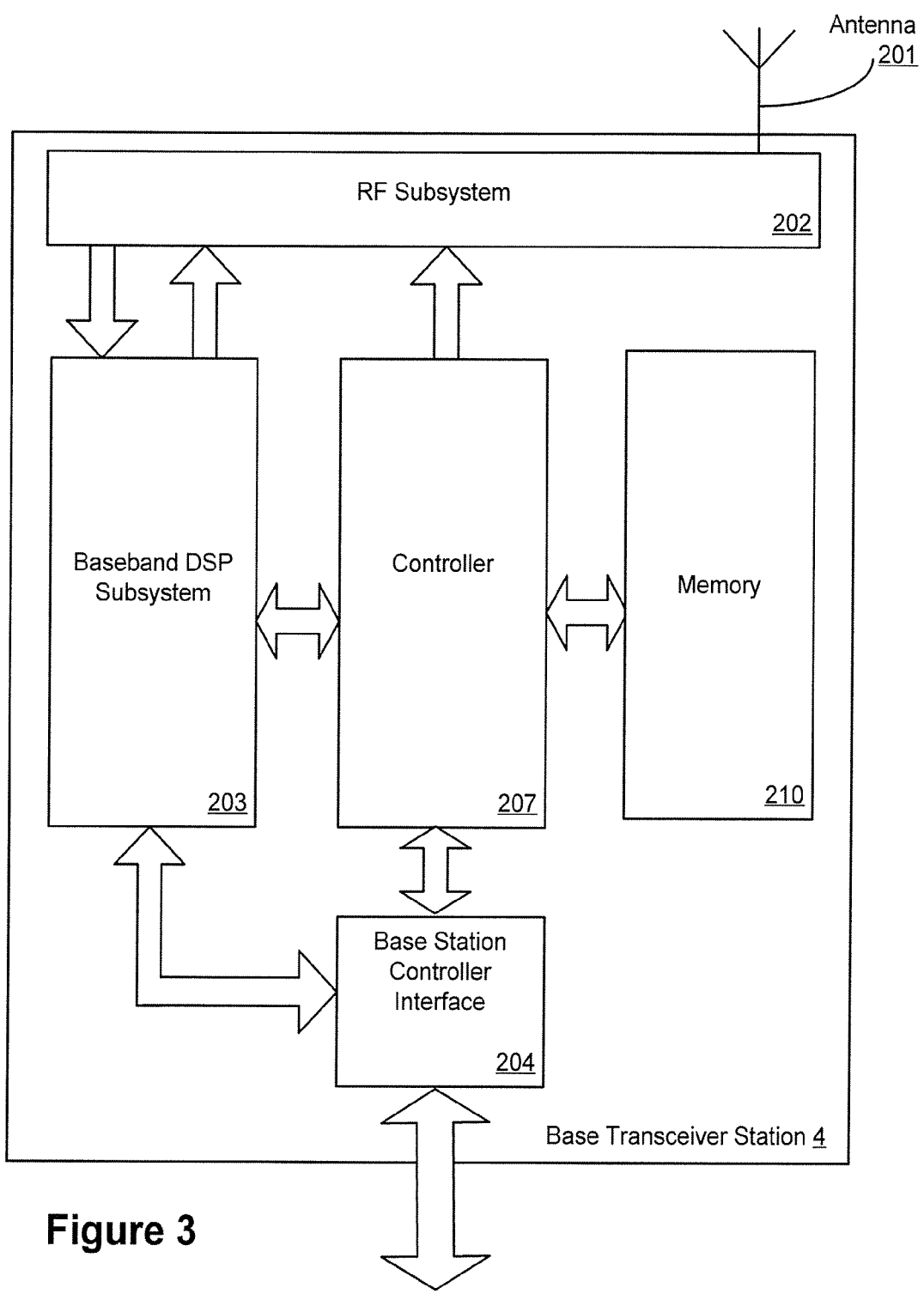
FIG. 3 is a block diagram of a base transceiver station.

Referring to FIG. 3, greatly simplified, the base transceiver station 4 comprises an antenna 201, an rf subsystem 202, a baseband DSP (digital signal processing) subsystem 203, a base station controller interface 204 and a controller 207.

The rf subsystem 202 contains the if and rf circuits of the base transceiver station's transmitter and receiver and a frequency synthesizer for tuning the base transceiver station's transmitter and receiver. The antenna 201 is coupled to the rf subsystem 202 for the reception and transmission of radio waves.

The baseband DSP subsystem 203 is coupled to the rf subsystem 202 to receive baseband signals therefrom and for sending baseband modulation signals thereto. The baseband DSP subsystems 203 includes codec functions which are well-known in the art.

The base station controller interface 204 interfaces the base transceiver station 4 to its controlling base station controllers 3a.

The controller 207 controls the operation of the base transceiver station 4. It is coupled to the rf subsystem 202 for supplying tuning instructions to the frequency synthesizer and to the baseband DSP subsystem for supplying control data and management data for transmission. The controller 207 operates according to a program stored in the memory 210.

The base station controllers 3a, 3b are responsible for allocating radio link resources to mobile stations and cause the base transceiver stations 4 to transmit power command signals to the mobile stations 6a, 6b. Under normal circumstances, the mobile stations 6a, 6b transmit with the power level which accord with these command signals. However, according to the present invention, this is not always the case as will be explained below.

Figure 4:
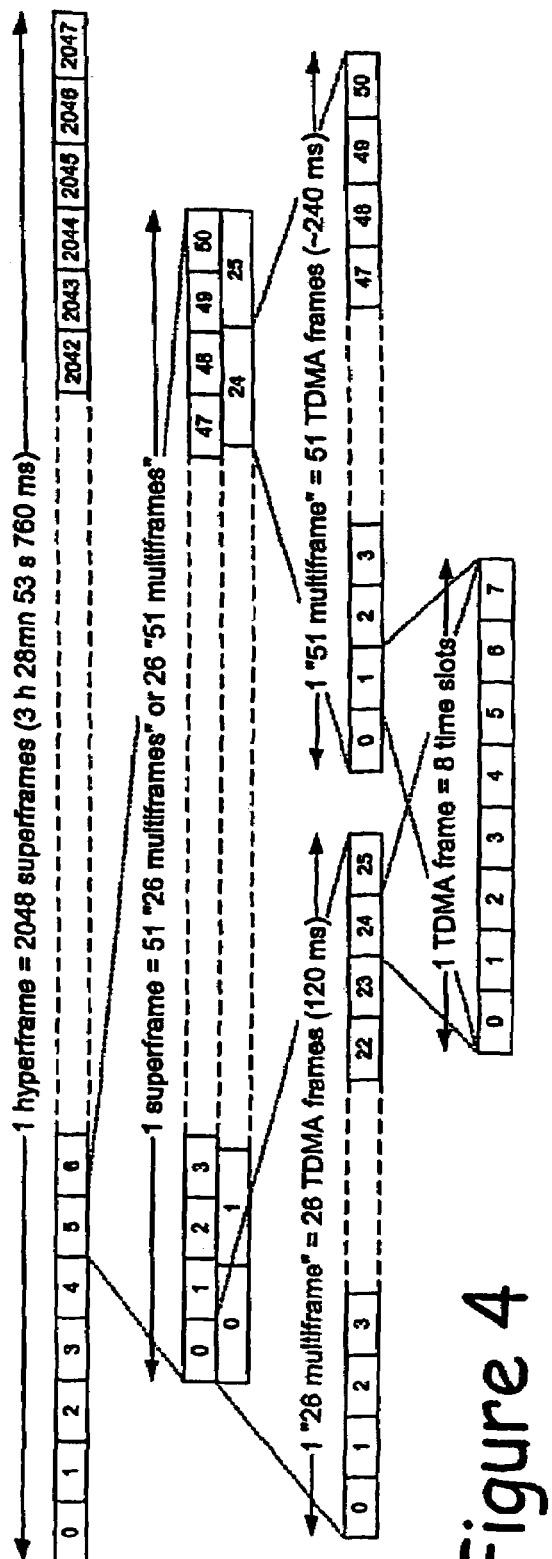
FIG. 4 illustrates the frame structure used in an embodiment of the present invention.
Figure 4:
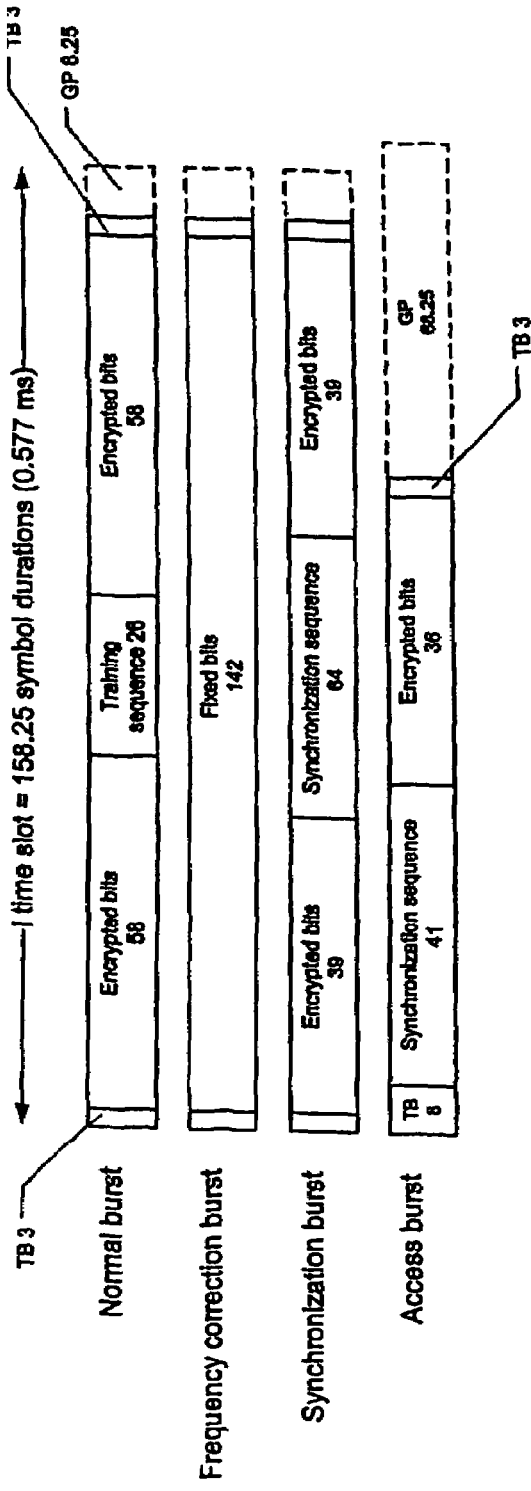

Referring to FIG. 4, each TDMA frame, used for communication between the mobile stations 6a, 6b and the base transceiver stations 4, comprises eight 0.577 ms time slots. A "26 multiframe" comprises 26 frames and a "51 multiframe" comprises 51 frames. Fifty one "26 multiframes" or twenty six "51 multiframes" make up one superframe. Finally, a hyperframe comprises 2048 superframes.

The data format within the time slots varies according to the function of a time slot. A normal burst, i.e. time slot, comprises three tail bits, followed by 58 encrypted data bits, a 26-bit training sequence, another sequence of 58 encrypted data bits and a further three tail bits. A guard period of eight and a quarter bit durations is provided at the end of the burst. A frequency correction burst has the same tail bits and guard period. However, its payload comprises a fixed 142 bit sequence. A synchronization burst is similar to the normal burst except that the encrypted data is reduced to two clocks of 39 bits and the training sequence is replaced by a 64-bit synchronization sequence. Finally, an access burst comprises eight initial tail bits, followed by a 41-bit synchronization sequence, 36 bits of encrypted data and three more tail bits. In this case, the guard period is 68.25 bits long.

When used for circuit-switched speech traffic, the channelisation scheme is as employed in GSM.

Figure 5:
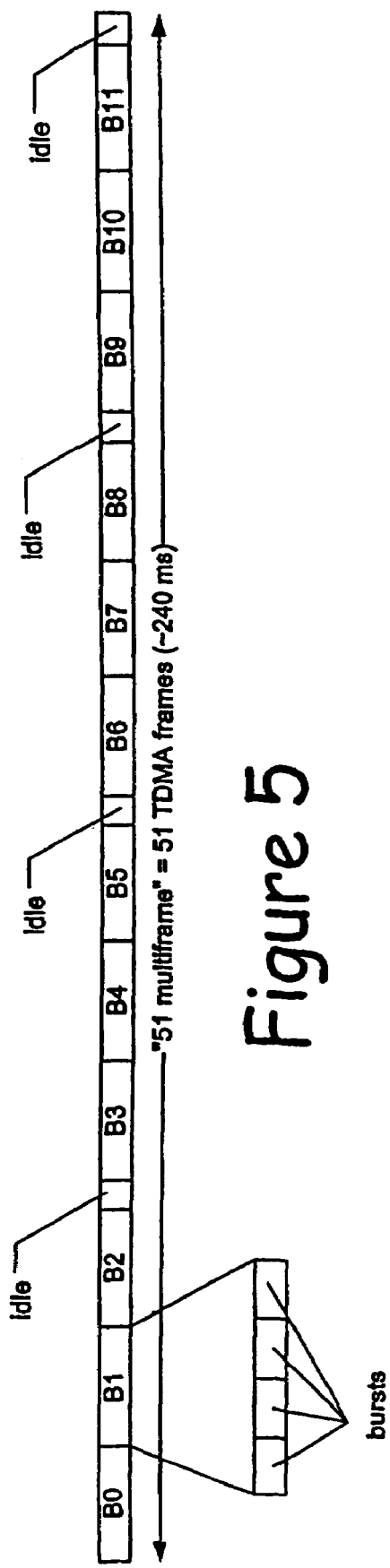
FIG. 5 illustrates a packet data channel in an embodiment of the present invention.

Referring to FIG. 5, full rate packet switched channels make use of 12 4-slot radio blocks spread over a "52 multiframe". Idle slots follow the third, sixth, ninth and twelfth radio blocks.

Figure 6:
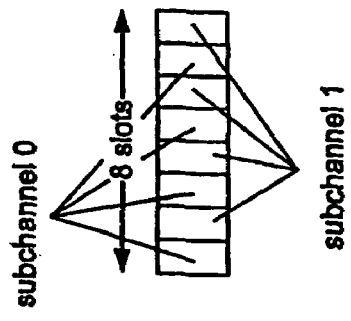
FIG. 6 illustrates the sharing of a radio channel between two half-rate packet channels in an embodiment of the present invention.

Referring to FIG. 6, for half rate, packet switched channels, both dedicated and shared, slots are allocated alternately to two sub-channels.

The baseband DSP subsystems 103, 203 and controllers 107, 207 of the mobile stations 6a, 6b and the base transceiver stations 4 are configured to implement two protocol stacks. The first protocol stack is for circuit switched traffic and is substantially the same as employed in conventional GSM systems. The second protocol stack is for packet switched traffic.

Figure 7:
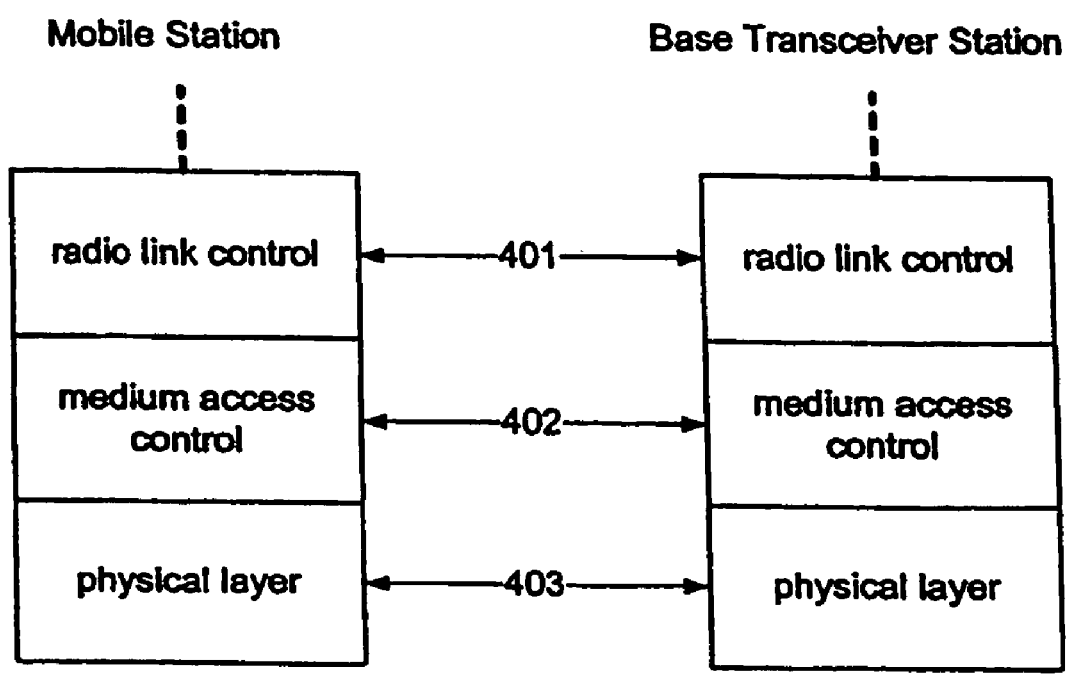
FIG. 7 illustrates the lower levels of a protocol stack used in an embodiment of the present invention.

Referring to FIG. 7, the layers relevant to the radio link between a mobile station 6a, 6b and a base station controller 4 are the radio link control layer 401, the medium access control layer 402 and the physical layer 403.

The radio link control layer 401 has two modes: transparent and non-transparent. In transparent mode, data is merely passed up or down through the radio link control layer without modification.

In non-transparent mode, the radio link control layer 401 provides link adaptation and constructs data blocks from data units received from higher levels by segmenting or concatenating the data units as necessary and performs the reciprocal process for data being passed up the stack. It is also responsible for detecting lost data blocks or reordering data block for upward transfer of their contents, depending on whether acknowledged mode is being used. This layer may also provide backward error correction in acknowledged mode.

The medium access control layer 402 is responsible for allocating data blocks from the radio link control layer 401 to appropriate transport or logical channels and passing received radio blocks from transport or logical channels to the radio link control layer 401.

The physical layer 403 is responsible to creating transmitted radio signals from the data passing through the transport or logical channels and passing received data up through the correct transport or logical channel to the medium access control layer 402.

Blocks are exchanged between the medium access control layer 402 and the physical layer 403 in synchronism with the radio block timing, i.e. block is passed to the physical layer at each radio block interval.

As the demand for bandwidth increases to support increasing transport or logical channel throughput, more slots are required. Increased slot usage can result in overheating of the mobile station's power amplifier and an unsupportable current demand.

In a first embodiment, the mobile station immediately changes its output power according to threshold slot usage/power combinations.

Figure 8:
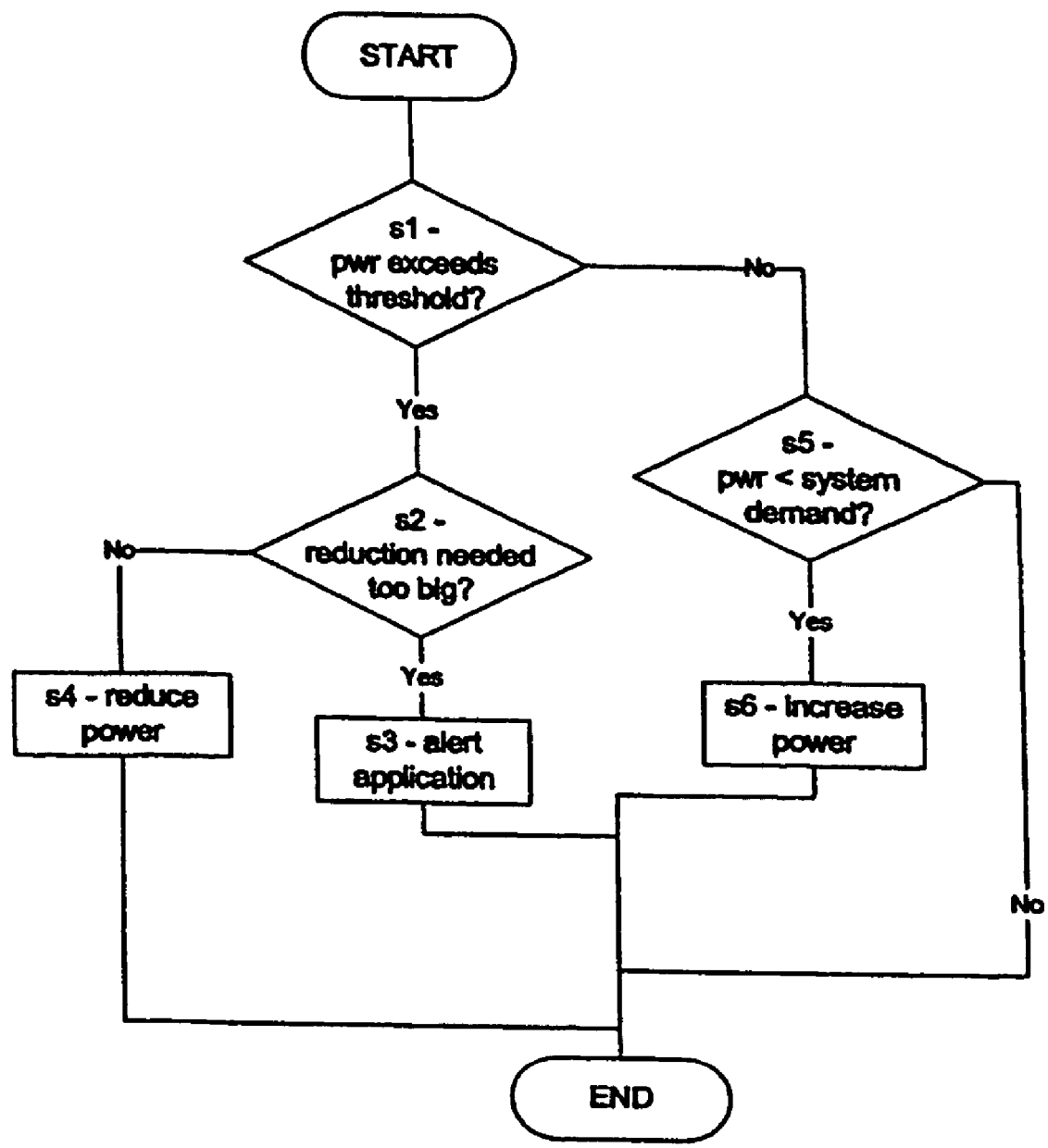
FIG. 8 is a flowchart illustrating a first embodiment of the present invention.

Referring to FIG. 8, when the demand for slots changes, the controller 107 of a mobile station 6a, 6b determines whether the current instantaneous power amplifier output power level exceeds a first threshold set for the number of slots to be used after change (step si). The first threshold is the instantaneous output power level that gives an acceptable average output power level. If the first threshold is exceeded, the controller 107 determines the power reduction required and compares this with a second threshold set at the power level, demanded of the mobile station 6a, 6b by the serving base station controller 3a, 3b, less an "allowable reduction" margin, for example 3 dB (step s2). If this reduced power level falls below the second threshold, the controller 107 notifies the application that the service requiring the extra slots cannot be provided (step s3). If the power reduction does not take the power amplifier output power level below the second threshold, the controller 107 reduces the output power accordingly (step s4). The process is left after steps s3 and s4.

If the first threshold is not exceeded (step s1), the controller 107 determines whether the current power amplifier output power level is less than the current power level demanded of the mobile station 6a, 6b by its serving base station controller 3a, 3b (step s5). This situation may arise where the slot usage is being reduced. If the current output power level is not less than the demanded level, the process is exited. However, if the current power level is below demanded level, the current power amplifier output power level is increased as dose to the demanded level as possible without exceeding the second threshold (step s6) and then the process is exited.

In a second embodiment, the mobile station changes its output power according to the temperature of its rf power amplifier, which is sensed by monitoring a convenient DC voltage in the amplifier or a temperature sensor (not shown) provided for the purpose. In this case the peak output power is kept on all slots at the level requested by the BSS until the temperature exceeds a threshold level, after which the output power will be reduced within specified limits.

Figure 9:
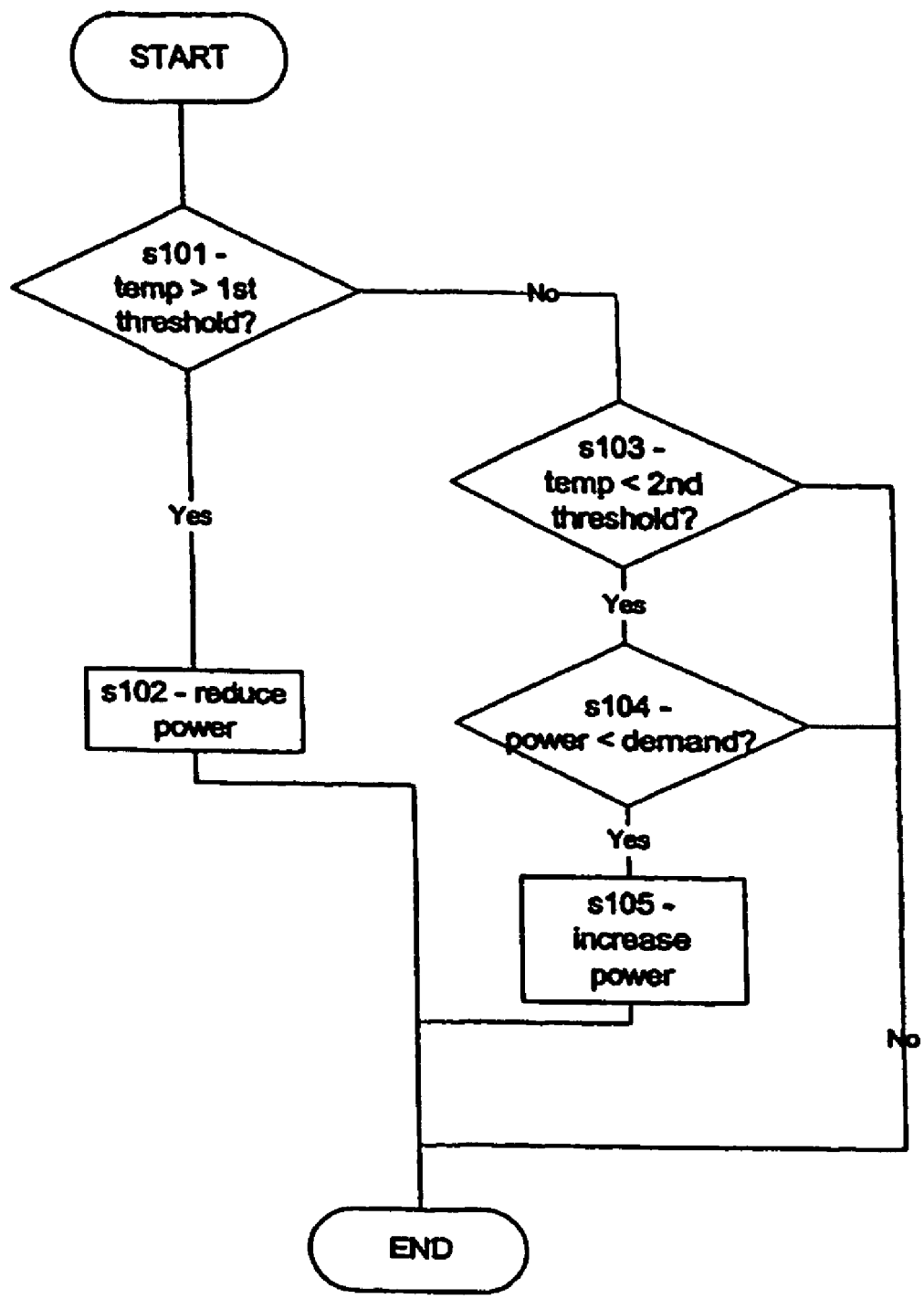
FIG. 9 is a flowchart illustrating a second embodiment of the present invention.

Referring to FIG. 9, the controller 107 regularly compares the temperature of the mobile station's if power amplifier with a first threshold, corresponding to a maximum allowable operating temperature (step s101). If the first threshold is exceeded, the controller 107, the power is reduced (step s102). The process is left after step s102.

If the first threshold is not exceeded (step s101), the temperature is compared with a second lower threshold (step s103). The second lower threshold is used to introduce some hysteresis into the power control. If the temperature is not below the second threshold, the process is exited. However, if the temperature is below the second threshold, the controller 107 determines whether the current power is below the level demanded by the serving base station controller 3a, 3b (step s104) and, if so, increases the output power level of the mobile station, for example by one 2 dB step s105, and the process is exited. Otherwise the procedure is simply exited without the output power of the mobile station being changed.

In a third embodiment, relatively high average power levels are allowed. However, such high power levels are adjusted down after a delay to avoid overheating while allowing short period of high bandwidth use.

Figure 10:
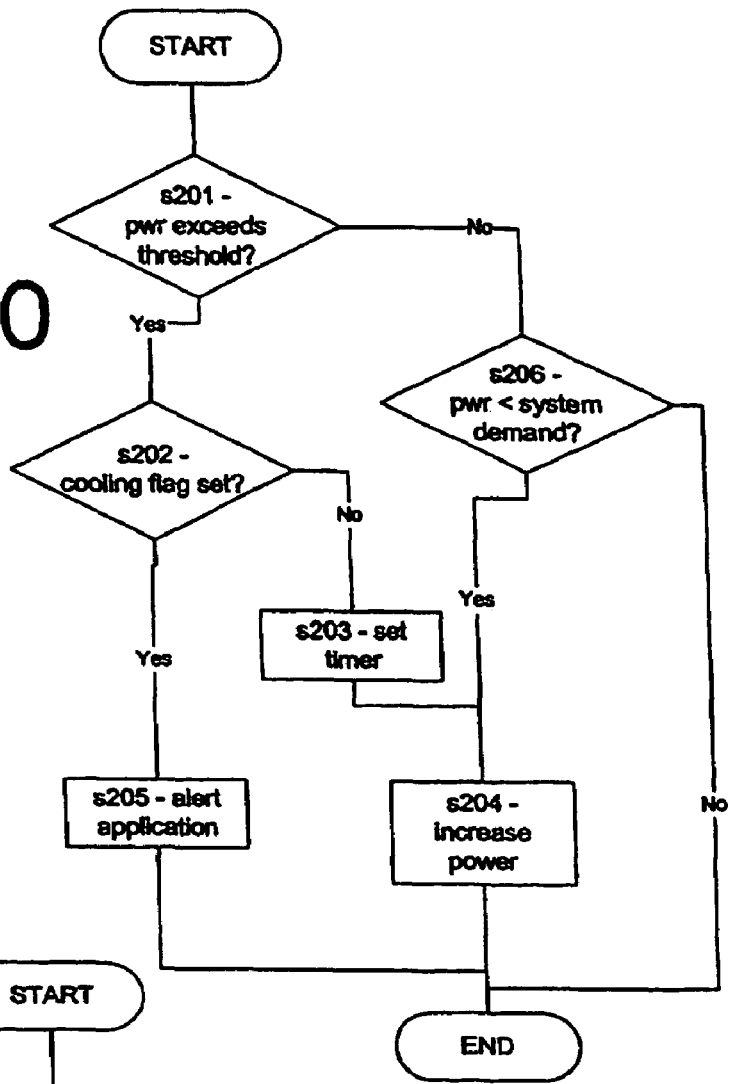
FIGS. 10 and 11 are flowcharts illustrating a third embodiment of the present invention.

Referring to FIG. 10, when the demand for slots changes, the controller 107 of the mobile station 6a, 6b determines whether the current instantaneous power amplifier output power level exceeds a first threshold (step s201). The first threshold is the instantaneous output power level that gives an acceptable average output power level. If the first threshold is exceeded, the controller 107 determines whether a cooling flag is set (step s202) and, if not, sets a timer (step s203), unless the timer is already running, increases the output power level (step 204) and exits the process. Otherwise the application is alerted that the service requiring the extra slots cannot be provided (step s205) and then the process is exited.

If the first threshold is not exceeded (step s201), the controller 107 determines whether the current instantaneous power amplifier output power level is less than the current power level demanded of the mobile station 6a, 6b by its serving base station controller 3a, 3b (step s206). This situation may arise where the slot allocation is being reduced. If the current instantaneous output power level is not less than the demanded level the process is exited. However, if the current power level is below demanded level it is increased as close to the demanded level as possible without exceeding the second threshold (step s204) and then the process is exited.

Figure 11:
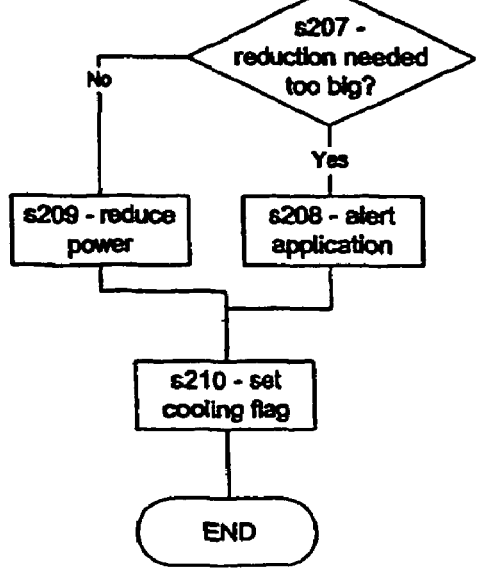

Referring to FIG. 11, when the timer expires, the controller 107 determines the power reduction required and compares this with a second threshold set at the power level demanded of the mobile station 6a, 6b by the serving base transceiver station 4 less an "allowable reduction" margin, for example 6 dB, step s207. If the reduced power falls below the second threshold, the controller 107 notifies the application that the service requiring the extra slots cannot be provided (step s208). If the power reduction does not take the power amplifier output power below the second threshold, the controller 107 reduces the output power accordingly (step s209). The cooling flag is also set when the timer expires (step s210).

An alternative to reducing the instantaneous output power is to reduce the average output power by not using all of the slots allocated to the mobile station by the serving base station controller 3a, 3b.

In a fourth embodiment, the mobile station immediately changes its actual slot usage according to threshold granted slot usage/power combinations.

Figure 12:
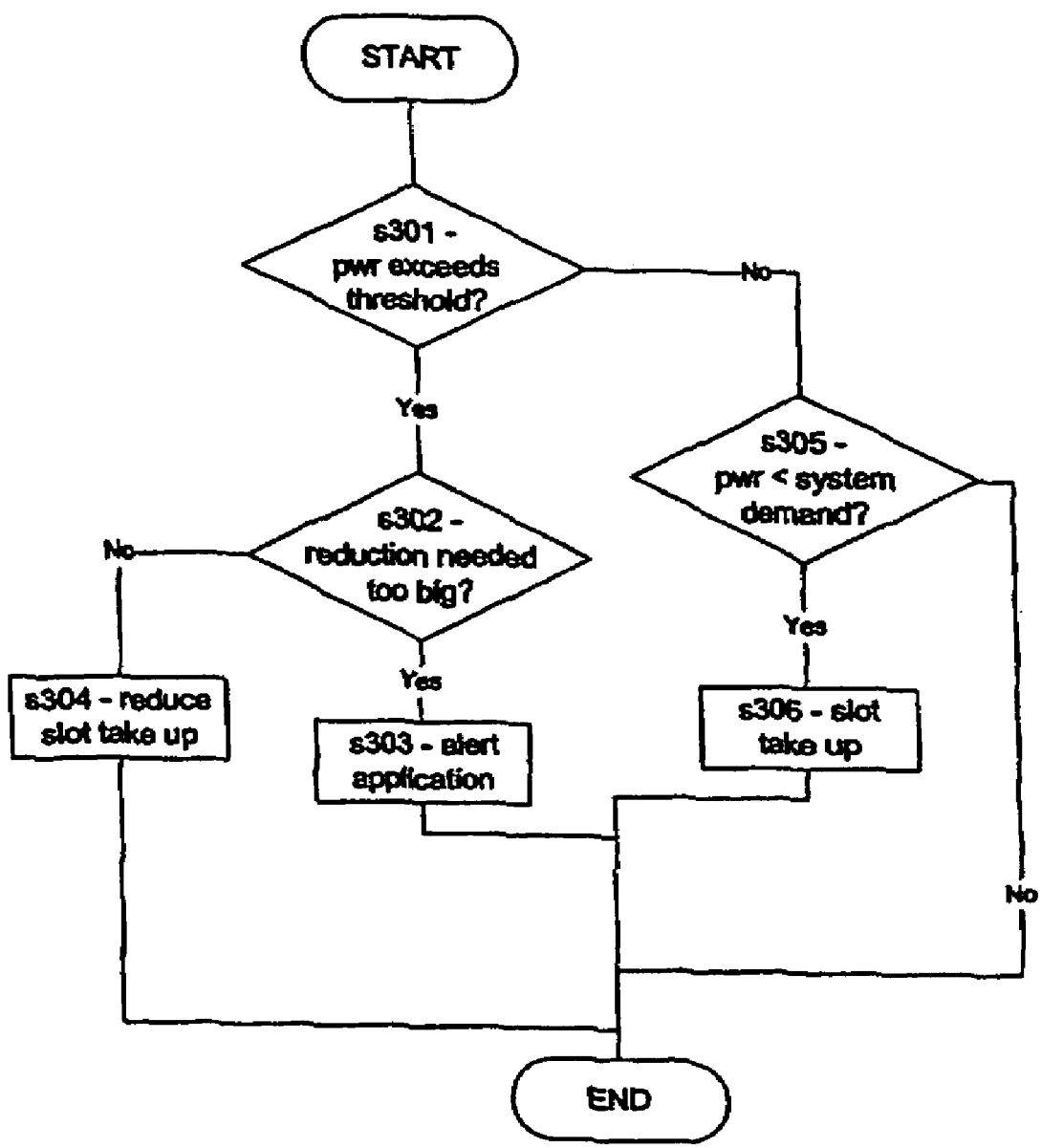
FIG. 12 is a flowchart illustrating a fourth embodiment of the present invention.

Referring to FIG. 12, when the demand for slots changes, the controller 107 of a mobile station 6a, 6b determines whether the new average power amplifier output power level would exceed a first threshold set for the number of slots to be used after change (step s301). If the first threshold is exceeded, the controller 107 determines the allocated slot take up reduction required to reduce the average power level below the first threshold. The new slot take up value is compared with a second threshold, i.e. the minimum number of slots required to support the current service level (step s302). If the reduced allocated slot take up falls below the second threshold, the controller 107 notifies the application that the service requiring the extra slots cannot be provided (step s303). If the slot take up reduction does not take the slot take up below the second threshold, the controller 107 reduces the proportion of the allocated slots used (step s304). The process is left after steps s303 and s304.

If the first threshold is not exceeded (step s301), the controller 107 determines whether the new average power amplifier output power would be less than the average corresponding to the current power level demanded of the mobile station 6a, 6b by its serving base station controller 3a, 3b (step s305). This situation may arise where the slot usage is being reduced. If the new average output power level would not be less than that corresponding to the demanded level, the process is exited. However, if the new average power level would be below that corresponding to the demanded instantaneous power level, the slot take up is increased as close to the allocated level as possible without the first threshold being exceeded (step s306) and then the process is exited.

In a fifth embodiment, the mobile station changes its allocated slot take up according to the temperature of its rf power amplifier, which is sensed by monitoring a convenient DC voltage in the amplifier or a sensor provided specifically for this purpose.

Figure 13:
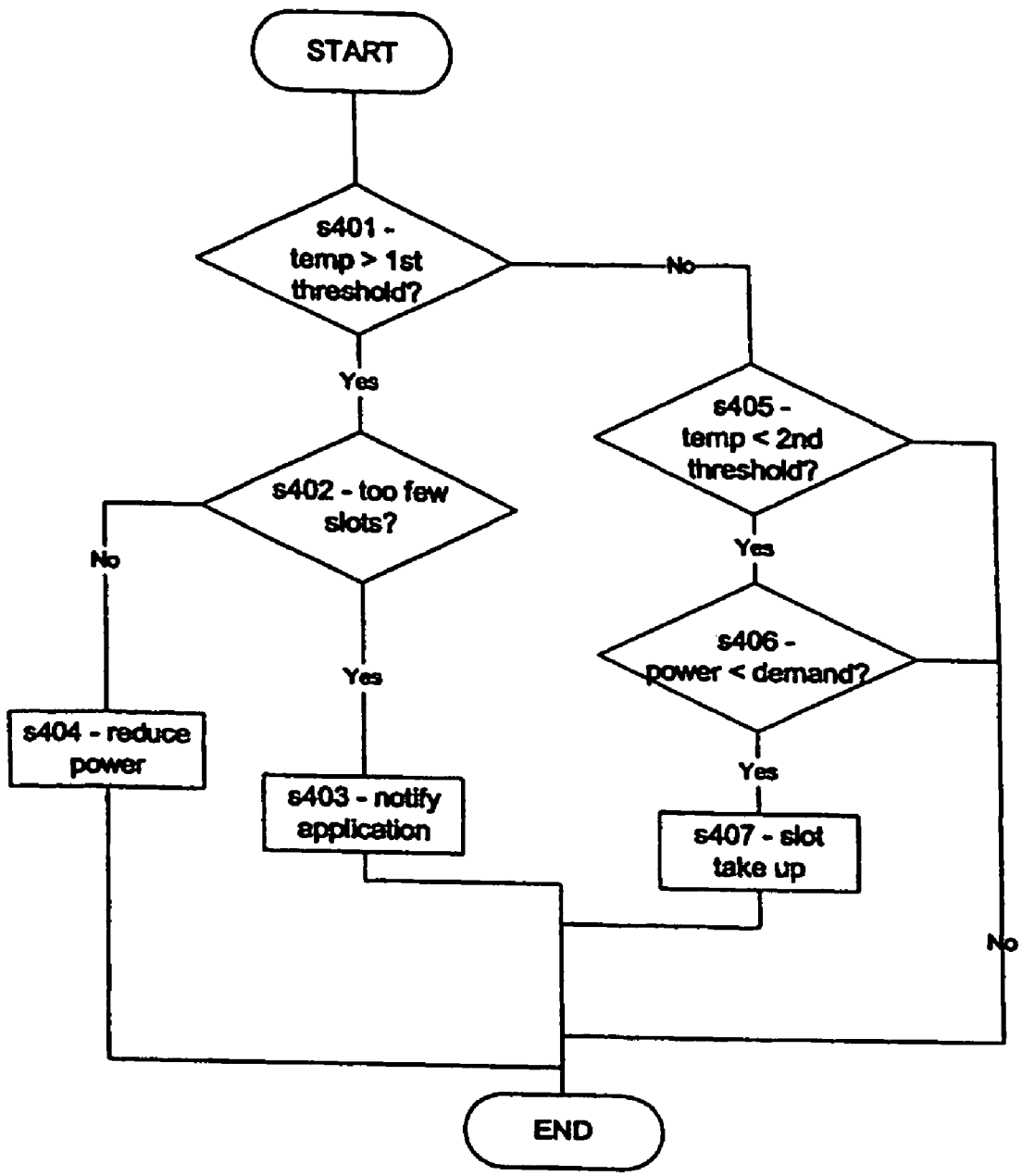
FIG. 13 is a flowchart illustrating a fifth embodiment of the present invention.

Referring to FIG. 13, the controller 107 regularly compares the temperature of the mobile station's rf power amplifier with a first threshold corresponding to a maximum allowable operating temperature (step s401). If the first threshold is exceeded, the controller 107 determines whether a reduction in the allocated slot take up is possible without abandoning a service (step s402). If the allocated slot take up would fall below the minimum acceptable level, a service or services can be lost due to insufficient resources and the application is notified of the lack of resources (step s403). Otherwise, the slot take up reduction is made (step s404). The process is left after steps s403 and s404.

If the first threshold is not exceeded (step s401), the temperature is compared with a second lower threshold (step s405). The second lower threshold is used to introduce some hysteresis into the slot take up control. If the temperature is not below the second threshold, the process is exited. However, if the temperature is below the second threshold, the controller determines whether the current average rf amplifier output power level is below that corresponding to the demanded power level from the serving base station controller 3a, 3b (step s406) and, if so, increases the allocated slot take up of the mobile station (step s407) and the process is exited. Otherwise the procedure is simply exited without the allocated slot take being changed.

In a sixth embodiment, the allocated slot take up is adjusted down after a delay to avoid overheating while allowing short period of high bandwidth used.

Figure 14:
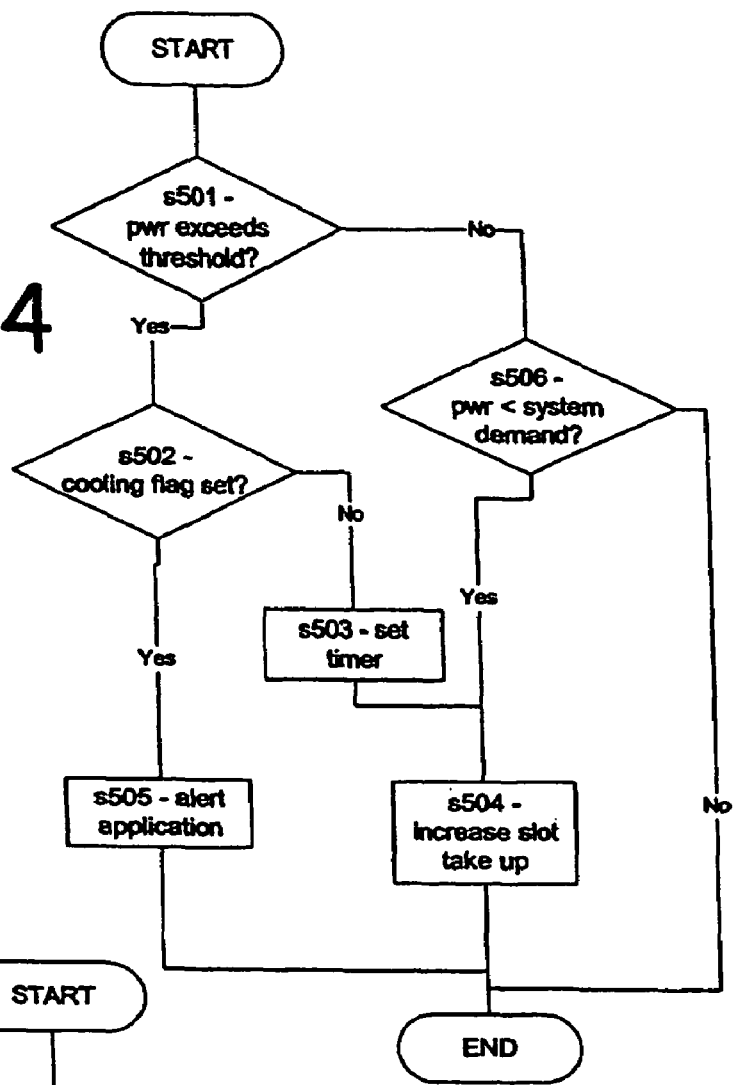
FIGS. 14 and 15 are flowcharts illustrating a sixth embodiment of the present invention.

Referring to FIG. 14, when the demand for slots changes, the controller 107 of a mobile station 6a, 6b determines whether the new average power amplifier output power level exceeds a first threshold (step s501). The first threshold is the instantaneous output power level that gives an acceptable average output power level. If the first threshold is exceeded, the controller 107 determines whether a cooling flag is set (step s502) and, if not, sets a timer (step s503), unless the timer is already running, increases the output power level (step 504) and exits the process. Otherwise the application is alerted that the service requiring the extra slots cannot be provided (step s505) and then the process is exited.

If the first threshold is not exceeded (step s501), the controller 107 determines whether the new average power amplifier output power level is less than that corresponding to the current power level demanded of the mobile station 6a, 6b by its serving base station controller 3a, 3b (step s506). This situation may arise where the slot allocation is being reduced. If the new average output power level would not be less than that corresponding to the demanded level, the process is exited. However, if the new average power level is below that corresponding to the demanded level the allocated slot take up is increased so that the average output power level is as close to that corresponding to the demanded level as possible without exceeding the second threshold (step s504) and then the process is exited.

Figure 15:
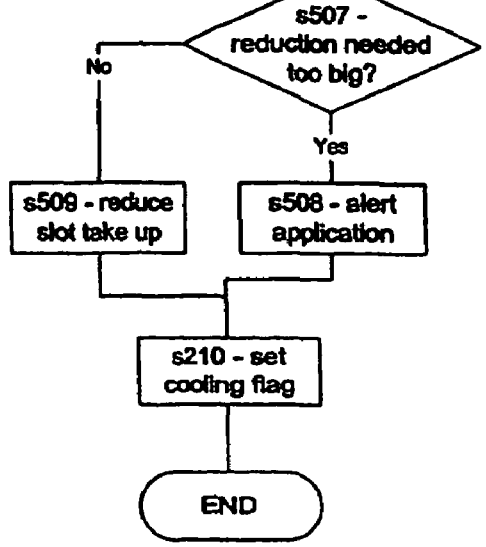

Referring to FIG. 15, when the timer expires, the controller 107 determines the allocated slot take up reduction required and compares this with a second threshold set at the minimum usable slot take up for supporting the current services, step s507. If the reduced slot take up falls below the second threshold, the controller 107 notifies the application that the service requiring the extra slots cannot be provided (step s508). If the power reduction does not take the power amplifier output power below the second threshold, the controller 107 reduces the output power accordingly (step s509). The cooling flag is also set when the timer expires (step s510).

The power averages referred to above are calculated from the instantaneous power power levels in a moving window. The length of the window will depend on the thermal characteristics of the rf power amplifier and the durations of slots and frames and the numbers of slots in a frame.

The invention claimed is:

1. A method comprising:
receiving a peak output power setting command from a base station;
receiving a transmit slot allocation from the base station;
detecting, at a mobile station, an increase in the mobile station's slot allocation;
responding to said detection by determining whether the received peak output power exceeds a threshold and, if so, modifying an average radio frequency output power of the mobile station over a plurality of slots, by reducing an instantaneous radio frequency output power during each transmit slot or the take up of allocated slots, such that it falls below what would have been an average output power level had the peak output power setting command been complied with in all of the allocated slots;
waiting a predetermined time between determination that said threshold has become exceeded and performing said modifying of the average output power; and
setting a cooling flag at the end of said predetermined time and setting a timer when said threshold is exceeded and the cooling flag is not set,
wherein the timer defines said predetermined time and said modifying of the average output power is performed when the timer times out.

2. A method according to claim 1, comprising running an application program on the mobile station and, when the timer expires, if it is determined that the required power reduction takes the output power below a lower threshold, alerting the application program that the service requiring the increase in the slot allocation cannot be supported.

3. A method according to claim 1, further comprising operating the mobile station in a time division multiple access network.

4. An apparatus comprising a controller configured to control the operation of a mobile station so as to:
receive a peak output power setting command from a base station;
receive a transmit slot allocation from the base station;
detect, at the mobile station, an increase in the mobile station's slot allocation;
respond to said detection by determining whether the received peak output power exceeds a threshold and, if so, modifying an average radio frequency output power of the mobile station over a plurality of slots, by reducing an instantaneous radio frequency output power during each transmit slot or the take up of allocated slots, such that it falls below what would have been an average output power level had the peak output power setting command been complied with in all of the allocated slots;

wait a predetermined time between determination that said threshold has become exceeded and performing said modifying of the average output power; and set a cooling flag at the end of said predetermined time and set a timer when said threshold is exceeded and the cooling flag is not set, wherein the timer defines said predetermined time and said modifying of the average output power is performed when the timer times out.

5. An apparatus according to claim 4, wherein the controller is configured to control the operation of the mobile station so as to:

run an application program on the mobile station and, when the timer expires, if it is determined that the required power reduction takes the output power below a lower threshold, alert the application program that the service requiring the increase in the slot allocation cannot be supported.

6. An apparatus according to claim 4, wherein said mobile station is configured to operate in a time division multiple access network.

7. An apparatus according to claim 4, further comprising a radio frequency output power amplifier.

8. An apparatus according to claim 4, further comprising a mobile station.

9. An apparatus according to claim 8, wherein the mobile station is configured to operate in a time division multiple access network.

10. An apparatus, comprising:

means for receiving a peak output power setting command from a base station;

means for receiving a transmit slot allocation from the base station;

means for detecting, at a mobile station, an increase in the mobile station's slot allocation;

means for responding to said detection by determining whether the received peak output power exceeds a threshold and, if so, modifying an average radio frequency output power of the mobile station over a plurality of slots, by reducing an instantaneous radio frequency output power during each transmit slot or the take up of allocated slots, such that it falls below what would have been an average output power level had the peak output power setting command been complied with in all of the allocated slots;

means for waiting a predetermined time between determination that said threshold has become exceeded and performing said modifying of the average output power; and means for setting a cooling flag at the end of said predetermined time and means for setting a timer when said threshold is exceeded and the cooling flag is not set, wherein the timer defines said predetermined time and said modifying of the average output power is performed when the timer times out.

11. An apparatus according to claim 10, further comprising:

means for running an application program on the mobile station and, when the timer expires, if it is determined that the required power reduction takes the output power below a lower threshold, means for alerting the application program that the service requiring the increase in the slot allocation cannot be supported.

* * * * *